Oct. 15, 1929.  U. G. LEE  1,732,192
WATER CLOSET INSTALLATION
Filed July 10, 1929
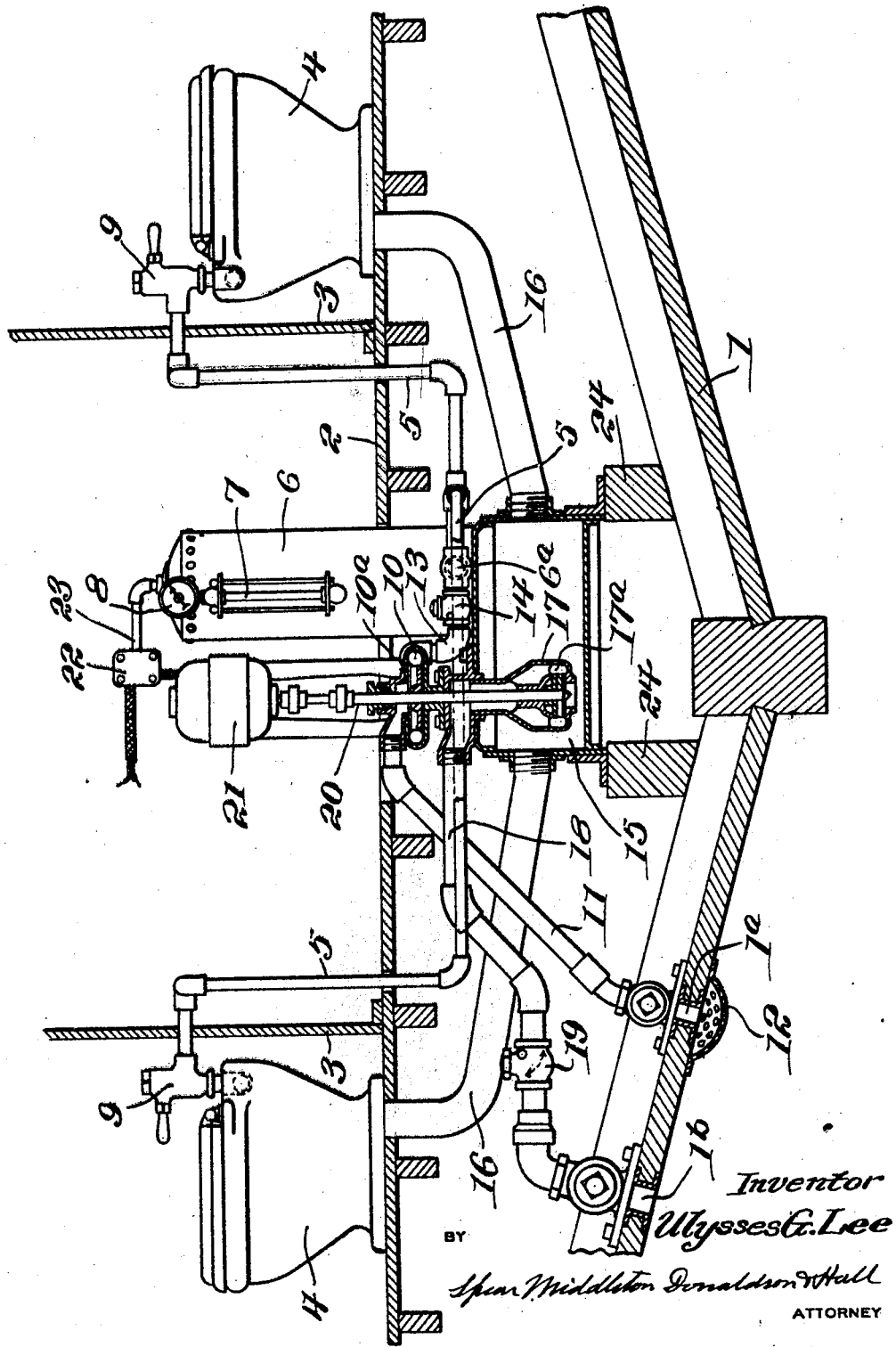
Inventor
Ulysses G. Lee
BY
Spear Middleton Donaldson & Hall
ATTORNEY Patented Oct. 15, 1929

1,732,192

UNITED STATES PATENT OFFICE

ULYSSES G. LEE, OF CHICAGO, ILLINOIS, ASSIGNOR TO U. G. LEE & CO., INC., OF CHICAGO, ILLINOIS, A CORPORATION OF ILLINOIS

WATER-CLOSET INSTALLATION

Application filed July 10, 1929. Serial No. 377,251.

My said invention relates to an improved water closet system or installation designed more especially for relatively large yachts and similar vessels, and aims to provide a simple arrangement by which flushing water will be supplied to a plurality of bowls from a common source, and the sewage drawn from the bowls and forcibly ejected against outside water pressure, both actions being automatically controlled by flushometers associated with the several bowls.

The invention further aims to provide an arrangement by which the flushing and sewage action will be effected by a single water pump and a single sewage ejection pump operated by a common motor.

With these objects in view the invention includes the novel arrangement or system hereinafter described and defined by the appended claims.

An embodiment of the invention is illustrated in the accompanying drawing in which the figure shows a cross section of a sufficient portion of a boat hull to illustrate the installation, showing two closet bowls as an example with the associated mechanism, this latter being shown partly in section.

Referring by reference characters to this drawing, the numeral 1 designates the boat hull, 2 the flooring, and 3 toilet room partitions within which are located the closet bowls 4 which may be of the ordinary or any desired type.

These are connected by pipes 5 with the lower part of a pressure tank 6 which is preferably provided with a gage glass 7 for indicating the water level therein, and a pressure gage 8. The flow of water from pipes 5 through pipes 6 to the respective bowls is controlled by flushometers 9 associated with the bowls, which flushometers may also be of the ordinary or any desired type.

Water is supplied to the tank 6 by means of a rotary pump comprising a rotary impeller 10 located in a pump chamber 10ª which is connected by pipe 11 with a port 1ª in the bottom of the hull, said port being provided with a screen indicated at 12, and which pump casing 10ª is also connected with the tank 6 by a pipe 13 provided with a check valve 14 to retain the water which has been forced into the tank when the pump action ceases. Preferably, pipes 5 and 10 have a common connection to tank 6 through a T coupling indicated at 6ª.

15 designates a sludge or sewage receiving tank to which the content of the bowls is conducted by pipes 16. Within the tank 15 is located a pump casing containing a rotary pump 17ª which withdraws the contents of the tank and ejects it through pipe 18 which communicates with a port 1ᵇ in the hull bottom and is provided with a check valve 19 which prevents backing up of sea water. The pump rotors 10ª and 17ª are located on a common shaft 20 driven by an electric motor 21, the action of which is controlled by a pressure switch 22 of the ordinary or any desired construction controlled by air pressure through pipe 23 communicating with the top of tank 6.

It will thus be seen that when the pumps are in operation, sea water will be forced by pump rotor 10ª into storage tank 6 until the accumulated water has built up sufficient air pressure over the water to cause the pressure switch to cut off current to the motor 21.

Should one of the closets be used, the operation of the flushometer would allow the air pressure to force water to the bowl for flushing purposes, which would immediately result in a drop in pressure in tank 6, whereupon the pressure switch would close the circuit and start the motor.

This results in actuating pump rotor 10ª to force more water into the tank to restore it to normal condition, and in simultaneously operating pump rotor 19ª to withdraw from the sludge tank the discharge from the bowl.

The sludge tank, as shown, is constructed to form a support for the tank 6, pumps and motor, and may be located in a well so as to be below the closet level, being shown as supported by sills 24 on the hull bottom.

Having thus described my invention, what I claim is:

1. Water closet apparatus comprising a plurality of bowls, a pressure tank having individual connections to said bowls, a flushometer for the connection to each bowl, automatic pump means for supplying water to the pressure tank, said pump means being controlled by variations in the pressure in the tank, a sludge tank with which the outlets of all the bowls connect, a pump for discharging sewage from said sludge tank and means for actuating said pump in synchronism with the water supply pump.

2. Water closet apparatus according to claim 1 in which the water and sewage pumps are located on a common motor shaft.

3. Apparatus according to claim 1 in which the sludge tank serves as a support for the water tank, pumps and motor.

In testimony whereof, I affix my signature.

ULYSSES G. LEE.